United States Patent
Marthinsen

(10) Patent No.: US 10,777,988 B2
(45) Date of Patent: Sep. 15, 2020

(54) CABLE REINFORCEMENT SLEEVE FOR SUBSEA CABLE JOINT

(71) Applicant: NEXANS, Courbevoie (FR)

(72) Inventor: Martin-Andreas Marthinsen, Skjeberg (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/838,763

(22) Filed: Dec. 12, 2017

(65) Prior Publication Data
US 2018/0198269 A1 Jul. 12, 2018

(51) Int. Cl.
| | | |
|---|---|---|
| H02G 15/00 | (2006.01) |
| H02G 15/007 | (2006.01) |
| H02G 15/113 | (2006.01) |
| H02G 15/14 | (2006.01) |
| E21B 17/00 | (2006.01) |
| E21B 17/02 | (2006.01) |
| H02G 9/00 | (2006.01) |
| H02G 15/18 | (2006.01) |

(52) U.S. Cl.
CPC ......... H02G 15/007 (2013.01); E21B 17/003 (2013.01); E21B 17/028 (2013.01); H02G 9/00 (2013.01); H02G 15/003 (2013.01); H02G 15/113 (2013.01); H02G 15/14 (2013.01); H02G 15/18 (2013.01)

(58) Field of Classification Search
USPC .................. 174/84 R, 84 C, 88 R, 91, 92, 93
See application file for complete search history.

(56) References Cited

U.S. PATENT DOCUMENTS

| | | | | |
|---|---|---|---|---|
| 3,804,972 A | * | 4/1974 | Gommans | H01R 9/0503 174/88 C |
| 4,034,151 A | * | 7/1977 | Silva | H02G 15/10 174/73.1 |
| 4,698,458 A | * | 10/1987 | Parmigiani | H02G 15/184 174/73.1 |
| 5,294,752 A | * | 3/1994 | Vallauri | H02G 15/18 174/73.1 |
| 5,382,756 A | | 1/1995 | Dagan | |
| 5,416,272 A | * | 5/1995 | Darcy | H02G 15/06 174/74 R |
| 5,606,149 A | * | 2/1997 | Yaworski | H02G 15/103 174/84 R |
| 5,875,547 A | * | 3/1999 | Larsson | H01R 4/70 156/49 |
| 6,281,442 B1 | * | 8/2001 | Guzowski | H02G 15/103 174/73.1 |
| 9,197,005 B2 | * | 11/2015 | Zaurrini | H01R 13/5213 |
| 2005/0213898 A1 | * | 9/2005 | Rubinstein | G02B 6/2553 385/99 |

(Continued)

FOREIGN PATENT DOCUMENTS

| | | | | |
|---|---|---|---|---|
| DE | 1024604 | * | 10/1954 | ............ H02G 23/07 |
| DE | 1024604 | | 2/1958 | |

OTHER PUBLICATIONS

International Search Report dated Apr. 6, 2017.

*Primary Examiner* — William H. Mayo, III
(74) *Attorney, Agent, or Firm* — Sofer & Haroun, LLP

(57) ABSTRACT

A high pressure cable reinforcement sleeve is provided having two or more bracket elements that are capable of forming a sleeve for surrounding a cable joint, wherein each bracket element has an outer wall and at least one inner protruding wall element.

16 Claims, 2 Drawing Sheets

(56) References Cited

U.S. PATENT DOCUMENTS

| | | | |
|---|---|---|---|
| 2007/0045003 A1 | 3/2007 | Cairns | |
| 2011/0286704 A1* | 11/2011 | Rubinstein | G02B 6/3802 385/99 |
| 2014/0235119 A1 | 8/2014 | Zaurrini | |
| 2014/0335712 A1* | 11/2014 | Semple | E21B 43/128 439/271 |
| 2017/0004904 A1 | 1/2017 | Guix Diaz et al. | |

* cited by examiner

CABLE REINFORCEMENT SLEEVE FOR SUBSEA CABLE JOINT

This application claims the benefit of priority from European Patent Application No. 16 306 731.7, filed on Dec. 19, 2016, the entirety of which is incorporated by reference.

FIELD OF THE INVENTION

The present invention relates to a subsea cable joint for handling high external water pressure. More specifically it relates to a reinforcement sleeve for a cable joint on a subsea cable, especially for a lapped cable joint.

BACKGROUND

There is an increasing interest in arranging subsea cables at larger water depths, both due to exploration of natural resources at increased depths but also due to an increase in the power grid coverage which encourage the arrangement of cables.

PRIOR ART

WO2015169976 discloses a reinforcement consisting of fibre-reinforced material to be arranged in the junction area adjacent to the outer cover of a subsea cable.

A prior art solution for preparing lapped joints is illustrated on FIG. 1. The conductor ends 1 are brought in electrical contact. A metallic ferrule 5 is surrounding the conductor ends and keeping them in place. The ferrule 5 is made of a similar conducting metal as the conductors, preferably copper. The ferrule may be compressed or bolted to the conductors. A splicing material 7 is arranged to provide insulation of the joint and give the joint a similar diameter as the insulated conductor 9. The splicing material according to the prior art has been a soft material such as self-amalgamating ethylene propylene rubber (EPR) tape. The tape is here wound such that a layer 8 is arranged surrounding the splicing material 7 and a short section of the insulation layer 9 made of cross linked poly ethylene (XLPE). A layer 11 of insulating self-amalgamating EPR tape replaces the cable insulation and a further layer 13 replaces the cables outer semiconducting layer in the joint, this can be made of conducting self-amalgamating EPR tape. Additional layers may surround layer 13 and protect the cable including the joint and such additional layers may comprise insulation, shielding and/or armouring or other layers.

When this prior art solution is used under high external pressure the pressure will result in a deformation around the joint as illustrated on FIG. 2. The deformation results in an hourglass shape. This deformed section of the cable will no longer have the expected properties and there is an increased risk of the cable malfunctioning.

U.S. Pat. No. 5,416,272 discloses a device for preventing insulation from shrinking back by including a shouldered ring mounted on and secured to the conductor, where the ring has a shoulder for fixing to the insulation and a shoulder for abutting against the insulation.

OBJECTIVES OF THE INVENTION

The present invention aims at avoiding pressure deformation of a cable joint to withstand the impact of radial and longitudinal pressure, as experienced at great water depths where there is a high external water pressure.

A further objective is to reinforce a lapped cable joint.

Another objective is to reinforce against radial and longitudinal pressure.

It is another objective of the present invention to provide both reinforcement of the joint and at the same time avoid longitudinal sliding of the end of an insulation layer on the cable leading up to the joint.

These objectives are reached by providing a cable reinforcement sleeve comprising two or more bracket elements that are arranged to form a sleeve for surrounding a cable joint, wherein each bracket element comprises an outer wall, wherein each bracket element further comprises at least one inner protruding wall element.

The outer wall of the bracket elements provides reinforcement against the radial pressure whereas the inner protruding wall element provides reinforcement against the longitudinal pressure.

In one aspect of the cable reinforcement sleeve the bracket elements are made of a rigid material, preferably metal, more preferably copper. The reinforcement sleeve is preferably made of a conductive material so that the sleeve can provide for improve conductivity within the joint, thereby further improving the electrical performance of a joint reinforced with the sleeve. In a further aspect of the cable reinforcement sleeve the outer walls of the bracket elements form a cylindrical outer surface, when these are joined to a sleeve. The bracket elements may be in the form of semi-cylindrical bracket elements arranged to form a cylindrical sleeve. The term "semi" as used here refers to a part and not necessarily a "half".

The brackets are adapted to be fastened to the cable adjacent to the joint. The fastening can be obtained by arranging a layer, such as a tape layer surrounding the sleeve and a section of the cable on each side of the sleeve.

In another aspect of the sleeve each bracket element comprises at least two fasteners for securing the bracket element to the cable on each side of the cable joint.

In another aspect of the reinforcement sleeve the at least two fasteners are respectively arranged in the longitudinal end sections of the bracket element. In a further aspect of the cable reinforcement sleeve the at least one inner protruding wall element is arranged in between the at least two fasteners. Thereby the fasteners can secure the bracket element to a cable on each side of the at least one wall element, thereby the wall element will have an effect on both cable ends of a joint reinforced by the sleeve.

In yet another aspect of the cable reinforcement sleeve, the at least one inner protruding wall element protrudes radially inwards. Further the at least one protruding wall element may comprise at least one protruding surface configured to abut the surface of a conductor. The protruding surface may have the form of a cylinder section and the bracket elements combined to a sleeve may thereby form an internal cylindrical surface for surrounding and abutting a cylindrical conductor arranged therein. The wall elements may be in the form of semicircular rings arranged to abut one another to form a circular reinforcing ring protruding from the inner circumference to the interior of the sleeve. When the wall elements abut one another they additionally reinforce the sleeve in the radial direction.

In a further aspect of the cable reinforcement sleeve the at least one inner protruding wall element is arranged for abutting an end surface of an insulation layer on one side of the cable joint, and wherein the fasteners are arranged to be fastened to said insulation layer.

In another aspect of the cable reinforcement sleeve, each bracket element comprises two inner protruding wall elements. Further the two inner protruding wall elements are arranged spaced apart in the longitudinal direction by an inner wall, wherein the longitudinal length of the inner wall is equal to or longer than the longitudinal length of the lapped joint on which the sleeve is to be arranged. In this aspect the inner protruding walls can respectively be arranged to abut the end surface of a insulation layer of each cable end entering the joint. Further the protruding surfaces of each inner protruding wall element may abut the conductor of each cable end entering the joint.

In a further aspect of the cable reinforcement sleeve the fasteners are threaded through holes, adapted for fastening the bracket element to the cable by arranging screws in the through holes.

In yet another aspect of the cable reinforcement sleeve the sleeve consists of two bracket elements forming a cylindrical outer surface. The sleeve being made up of two or more bracket elements each having an outer wall in the form of a longitudinal cylinder section provides for installation of the sleeve after the cable conductors have been joint using a ferrule.

The present invention further provides a subsea cable joint comprising two cable ends each comprising a conductor surrounded by an insulation layer, wherein the two conductor ends are joint and covered by a ferrule, wherein a reinforcement sleeve comprising at least two bracket elements surrounds the ferrule and wherein the bracket elements comprise two inner protruding walls that respectively abut the ends of the insulation layers of each cable and wherein the bracket elements are secured to the insulation layers of each cable by fasteners arranged in longitudinal end sections of the bracket elements.

In one aspect of the subsea cable joint according to the present invention the protruding wall elements comprise at least one radially protruding surface that abut the surface of the conductor.

In another aspect of the subsea cable joint a conductive filler is arranged within the reinforcement sleeve. The reinforcement sleeve is preferably made of a conductive material and the conductive filler provides for improved electrical performance of the joint compared to a joint including the splicing material according to the prior art.

The reinforcement sleeve is in a preferred embodiment applicable for use on a cable joint wherein the cables comprise an insulation layer made of crosslinked poly ethylene (PEX).

The term "great water depths" is used herein to refer to below 400 m, more preferably below 500 m and even more preferably below 600 m.

BRIEF DESCRIPTION OF THE DRAWINGS

The present invention will be described further with reference to the enclosed figures.

The figures are provided as illustrations and the scope of the present invention is defined by the enclosed claims.

PRINCIPAL DESCRIPTION OF THE INVENTION

Figure 1:
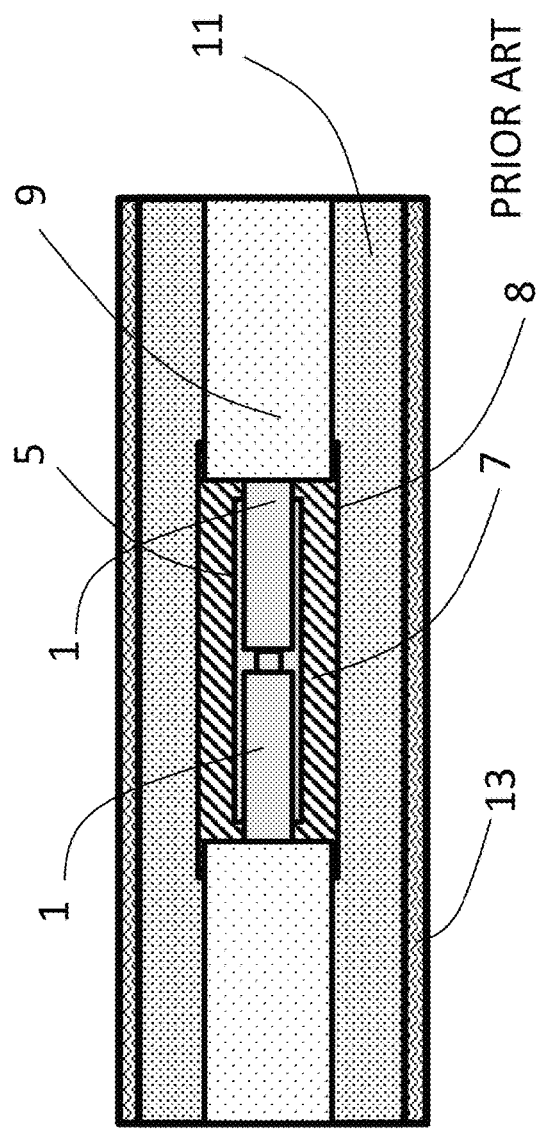
FIG. 1 shows a schematic longitudinal cross sectional view of a prior art cable joint.
Figure 2:
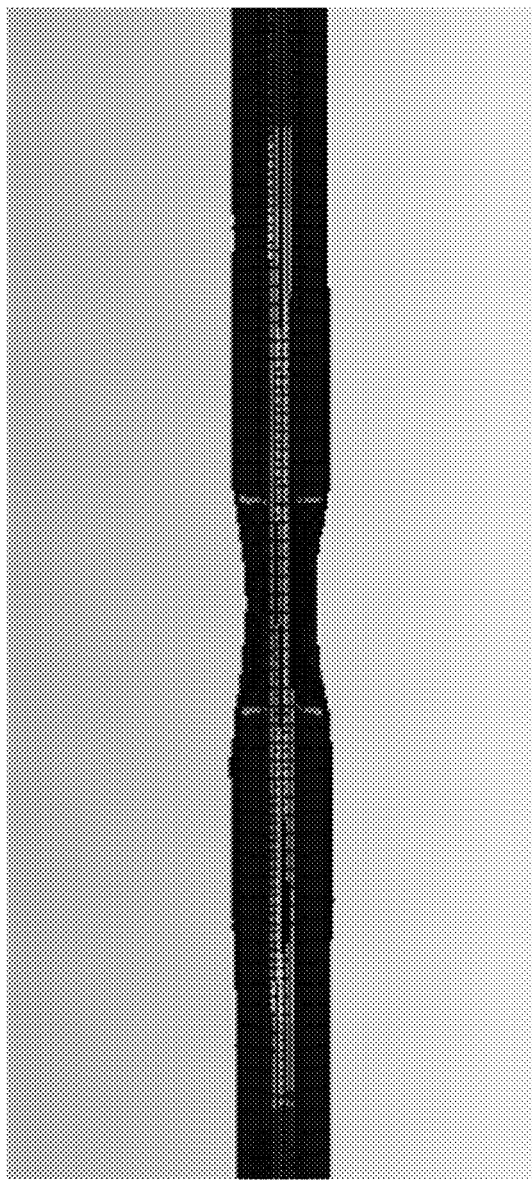
FIG. 2 illustrates the prior art joint when subject to high external pressure.
Figure 3:
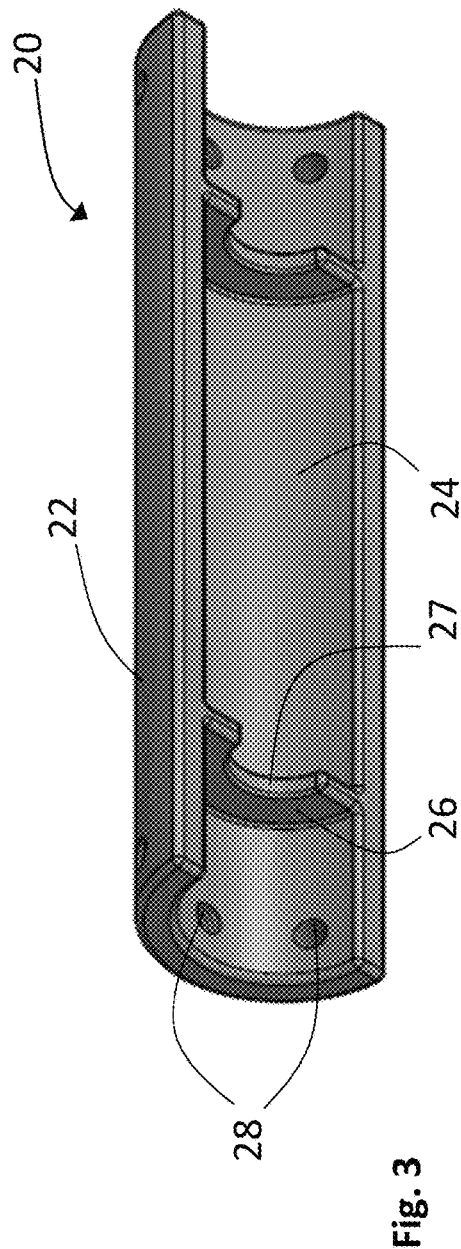
FIG. 3 illustrates an embodiment of a bracket element according to the present invention.

An embodiment of a bracket element 20 according to the present invention is illustrated on FIG. 3. In this embodiment two identical bracket elements 22 make up a cylindrical reinforcement sleeve that will surround the circumference of the cable and surround the joint as well as parts of the cable on either side of the joint.

The bracket element 20 comprises an outer wall 22 in the form of a cylinder section having a semi-cylindrical shape. In this embodiment the cross section of each cylinder section spans a circle section of 180 degrees so that two such brackets can be combined to provide a cylindrical sleeve with an outer wall that can full surround a cable joint arranged therein. In the embodiment disclosed on in FIG. 3 the bracket element comprises fasteners 28 for securing the bracket to the cable. In the illustrated embodiment the fasteners are in the form of treaded trough holes 28 in which screws can be arranged and screwed into a cable section arranged within the sleeve. The fasteners are arranged in each longitudinal end section of the bracket element, this provides for the fastening of the bracket element to sections of the cable more longitudinal remote from the joint.

In other embodiments the fasteners can be through holes for arranging a nail through the sleeve and into a cable section arranged therein or the fasteners can be a grooves or tongues adapted to fit with tongues or grooves arranged on the cable section to which the sleeve is to be fastened. Alternatively the sleeve can be secured to the cable by providing a tape layer on outside of the sleeve at least covering the longitudinal ends of the sleeve and the adjacent cable sections.

The bracket element comprises at least one inner protruding wall element 26. The wall element comprises one side arranged for facing the cable entering into the joint and one side arranged for facing the joint. Further the wall element may comprise a longitudinal surface 27 adapted to abut a conductor of a cable. The side of the wall element for facing the cable entering the joint is arranged to abut an end surface of an insulation layer arranged on the cable. In the illustrated embodiment the wall elements are in the form of a semi-circular ring. When the bracket elements are combined to form a sleeve the two semi-circular wall elements abut to form a reinforcing ring with a passage for the conductor. The completed ring thereby may form a circular reinforcement which provides reinforcement both in the radial direction but where the wall elements also enforce the joint in a longitudinal direction. The fasteners 28 are arranged in the bracket element in an end section between a longitudinal end of the bracket element and the inner protruding wall element, so that the bracket element through the fasteners 28 can be fastened to the insulation layer of the cable entering the joint where the insulation layer abuts the side of the wall element. In the embodiment of the bracket element illustrated on FIG. 3 there are fasteners 28 in each of the longitudinal end sections and two inner protruding wall elements arranged to abut an insulation layer of the cables entering the joint from both sides. The number of fasteners can be adjust to provide the required strength in the connection between the bracket and the cable. The inner wall 24 of the bracket element is in the form of a cylindrical wall adapted to receive joint conductors surrounded by a ferrule.

Figure 4:
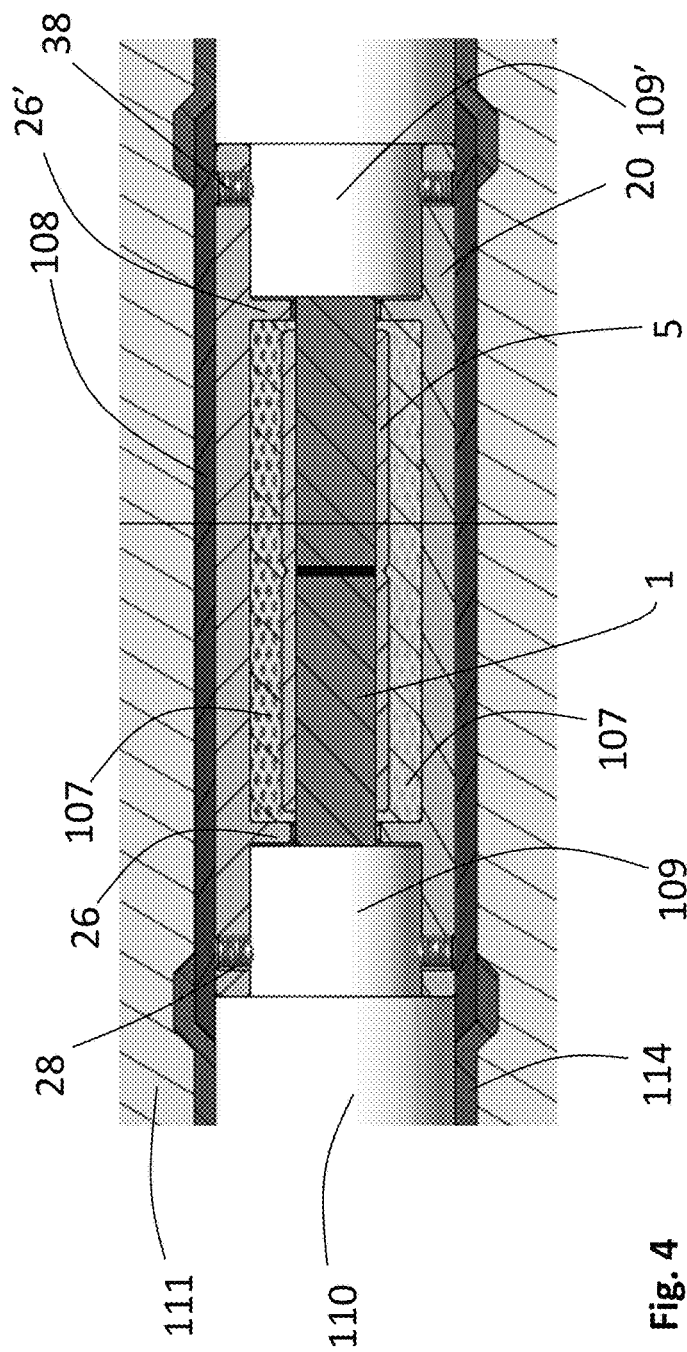
FIG. 4 illustrates a schematic longitudinal cross sectional view of a cable joint according reinforced with a sleeve according to the present invention.

FIG. 4 is a cross sectional view in the longitudinal direction of a joint fitted with a reinforcement sleeve according to the present invention. The conductor ends 1 are brought in electrical contact. In the same way as in a traditional joint. A ferrule 5 is arranged surrounding the conductor. The reinforcement sleeve comprising bracket elements 20 is arranged surrounding the joint conductors 1 and the ferrule 5. The volume between the ferrule 5 and the inner wall 24 of the bracket elements is filled with a conducting filler 107, such as a metal mesh.

The material for the bracket elements and the conducting filler is preferable selected to be compatible with the material of the conductor of the cable on which the reinforcement sleeve is to be installed. In a preferred embodiment when the conductor in the joint cables is made of copper the bracket elements and the conducting filler are also made of copper. Thereby the reinforcement sleeve provides for improved conductivity trough the joint and secures an improved electrical connection.

The inner protruding wall elements 26 and 26' abut the insulation layer 109 and 109' of the cable ends entering the joint from each side respectively. The insulation layer 109, 109' is in one embodiment made of XLPE. The cable ends further comprise insulation layer 110 of the same material as 109. The diameter of the layer 110 and/or the sleeve is adapted to be equivalent. The diameter of the insulation layer 109 or the bracket element is adapted to fit within the end sections of the sleeve and abut the protruding wall elements. Fastening elements in the form of screws 38 are in this embodiment secured in the fasteners 28 and fasten the bracket element of the sleeve to the insulation layer 109/109'. The combination of the inner wall 26 abutting the insulation layer 109 and the fastening of the bracket elements to the insulation layer 109 has the effect that in the insulation layer 109 is restricted from sliding in both longitudinal directions.

On the outside of the reinforcement sleeve 20 a layer 108 is arranged surrounding the reinforcement sleeve and a section of the insulation layer 110 on each side of the joint. The layer 108 replaces the cables inner semiconducting layer in the joint.

The layer 108 is preferably made of a conducting self-amalgamating EPR-tape. In the illustrated embodiment a field controlling layer 114 is arranged outside the insulation layer 110, such as a field control mastic (MFC). FIG. 4 further discloses an outer insulating layer 111 covering the joint and the cable, this can be made for an insulating self-amalgamating EPR tape. The layer 111 replaces the insulation of the cable in the joint area.

The cable may comprise further layers such as insulation layer(s), semiconducting layer(s), pressure layer(s), protection layer(s) and other layer(s) not illustrated in the drawings.

The invention claimed is:

1. Subsea cable joint comprising two cable ends each comprising a conductor surrounded by an insulation layer and a semi-conductive layer, wherein the two conductor ends are joint, the subsea cable joint further comprising
   a cable reinforcement sleeve comprising
   two or more bracket elements that are arranged to form a sleeve,
   wherein each bracket element comprises an outer wall,
   wherein each bracket element further comprises two inner protruding walls that respectively abut the ends of the insulation layers of each cable,
   a conducting layer surrounding and contacting the two bracket elements, the conducting layer being in electrical contact with each of the semiconducting layers of the two or more cables.

2. The subsea cable joint according to claim 1, wherein the bracket elements are made of a rigid material, preferably metal, more preferably copper.

3. The subsea cable joint according to claim 1, wherein the outer walls of the bracket elements form a cylindrical outer surface, when these are joined to form a sleeve.

4. The subsea cable joint according to claim 1, wherein each bracket element comprises at least two fasteners for securing the bracket element to the cable on each side of the cable joint.

5. The subsea cable joint according to claim 4, wherein at least two fasteners are respectively arranged in the longitudinal end sections of the bracket element.

6. The subsea cable joint according to claim 4, wherein the at least one inner protruding wall element is arranged in between the at least two fasteners.

7. The subsea cable joint according to claim 4, wherein the at least one inner protruding wall element is arranged for abutting an end surface of an insulation layer on one side of the cable joint, and wherein the fasteners are arranged to be fastened to said insulation layer.

8. The subsea cable joint according to claim 4, wherein the fasteners are threaded through holes, adapted for fastening the bracket element to the cable by arranging screws in the through holes.

9. The subsea cable joint according to claim 1, wherein the at least one inner protruding wall element protrudes radially inwards.

10. The subsea cable joint according to claim 1, wherein the at least one protruding wall element comprises at least one protruding surface configured to abut the surface of a conductor.

11. The subsea cable joint according to claim 1, wherein each bracket element comprises two inner protruding wall elements.

12. The subsea cable joint according to claim 11, wherein the two inner protruding wall elements are arranged spaced apart in the longitudinal direction by an inner wall, such that the longitudinal length of the inner wall is adapted to be equal to or longer than the longitudinal length of the lapped joint on which the sleeve is to be arranged.

13. The subsea cable joint according to claim 1,
   wherein the two conductor ends are covered by a ferrule, and
   wherein said reinforcement sleeve withstands subsea external water pressure of a depth of at least 400 m.

14. The subsea cable joint according to claim 1, wherein the bracket elements are secured to the insulation layers of each cable by fasteners arranged in longitudinal end sections of the bracket elements.

15. The subsea cable joint according to claim 1, wherein the protruding wall elements comprise at least one radially protruding surface that abut the surface of the conductor.

16. The subsea cable joint according to claim 1, wherein a conductive filler is arranged within the reinforcement sleeve.

* * * * *